United States Patent
Kleindl

(10) Patent No.: US 8,248,979 B2
(45) Date of Patent: Aug. 21, 2012

(54) METHOD FOR CONTROLLING BASE STATIONS IN WIRELESS COMMUNICATION NETWORKS

(75) Inventor: Günter Kleindl, Ybbs/Donau (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 885 days.

(21) Appl. No.: 12/084,078

(22) PCT Filed: Oct. 19, 2006

(86) PCT No.: PCT/EP2006/067592
§ 371 (c)(1),
(2), (4) Date: Apr. 24, 2008

(87) PCT Pub. No.: WO2007/048750
PCT Pub. Date: May 3, 2007

(65) Prior Publication Data
US 2009/0290561 A1 Nov. 26, 2009

(30) Foreign Application Priority Data
Oct. 26, 2005 (DE) .................. 10 2005 051 291

(51) Int. Cl.
*G08C 17/00* (2006.01)
(52) U.S. Cl. ........................................ 370/311
(58) Field of Classification Search .............. 370/311
See application file for complete search history.

(56) References Cited

U.S. PATENT DOCUMENTS

| 6,584,330 | B1 | 6/2003 | Ruuska | |
|---|---|---|---|---|
| 6,978,149 | B1* | 12/2005 | Morelli et al. | 455/522 |
| 2004/0110506 | A1* | 6/2004 | Dent | 455/437 |
| 2005/0054389 | A1 | 3/2005 | Lee et al. | |
| 2005/0190711 | A1 | 9/2005 | Morimoto | |
| 2006/0084438 | A1* | 4/2006 | Kwon | 455/436 |
| 2007/0188382 | A1* | 8/2007 | Shin et al. | 342/386 |

FOREIGN PATENT DOCUMENTS

| WO | WO 9826614 A2 | 6/1998 |
|---|---|---|
| WO | WO 9857516 A2 | 12/1998 |
| WO | WO 0192992 A2 | 12/2001 |
| WO | WO 0207464 A1 | 1/2002 |
| WO | 2004075583 | 9/2004 |

* cited by examiner

Primary Examiner — Kenny Lin
(74) Attorney, Agent, or Firm — Buchanan Ingersoll & Rooney PC

(57) ABSTRACT

A base station is controlled inactively provided that no radio signal is received from a mobile terminal in the radio range thereof while radio signals can still be receive from mobile terminals. An inactively controlled base station is once again controlled actively when a radio signal of at least one mobile terminal is received. The radio range, of the base station, is deactivated while radio signals can be received from the mobile terminal when the base station is controlled inactively. Thus, the number of actively controlled base station may be minimized and the environmental impact of radio signals caused by the base stations reduced.

13 Claims, 1 Drawing Sheet

METHOD FOR CONTROLLING BASE STATIONS IN WIRELESS COMMUNICATION NETWORKS

CROSS REFERENCE TO RELATED APPLICATIONS

This application is the US National Stage of International Application No. PCT/EP2006/067592, filed Oct. 19, 2006 and claims the benefit thereof. The International Application claims the benefits of German application No. 10 2006 051 291.7 DE filed Oct. 26, 2005, both of the applications are incorporated by reference herein in their entirety.

FIELD OF INVENTION

The present invention relates to controlling base stations in wireless communication networks.

BACKGROUND OF INVENTION

Wireless communication networks such as WLANs (wireless local area networks) or mobile radio networks for example are formed by base stations, whereby the base stations each have a radio transmitter unit which in each case implement a radio area. The radio areas or radio cells of the base stations are designed to be predominantly overlapping in the area of the respective communication network in order to ensure a continuous overall radio area for the wireless communication network.

Mobile terminals of wireless communication networks are registered in the case of stationary operation in a radio area and a connection, or a communication relationship, from a mobile terminal to a further mobile terminal or also a cabled terminal is effected by way of the base station, in which the mobile terminal is currently registered. If the mobile terminal moves from one radio area or from one base station into a further adjacent radio area or to the base station implementing the further radio area, at the edge of the radio area in which the mobile terminal is registered the mobile terminal is redirected from the one to the other base station. To this end, in the mobile terminal the levels of the received radio signals from the adjacent radio areas are measured and if the level of the radio signal from the further radio area exceeds the level of the radio signal from the current radio area the terminal is redirected from the current to the further base station—also referred to in professional circles as a handover. This handover procedure is standardized in the GSM or WLAN or DECT wireless communication networks, whereby the communication relationship for the respective mobile terminal is also redirected precisely from a current to a further base station by the handover procedure.

In order to achieve such a handover of the terminal, the base stations or the radio stations of the radio areas must at least periodically emit a radio signal so that the respective radio area can be recognized or the level of the received radio signal can be measured by the mobile terminal. This periodic emission of the radio signal by a base station must occur even if no connection is switched or routed by way of the respective base station or if no mobile terminal is activated in the radio area of the respective base station.

SUMMARY OF INVENTION

The object of the invention is to configure the control of the base stations in wireless communication networks in a more efficient manner. The object is achieved by the features described in the independent claims.

The fundamental aspect of the invention consists in the fact that a base station is switched to inactive if no radio signal is received from one of the mobile terminals, whereby radio signals can continue to be received from mobile terminals. If a base station which has been switched to inactive receives a radio signal from at least one mobile terminal, this base station is switched to active.

One important advantage of the invention consists in the fact that the number of base stations which emit radio signals is reduced to a minimum because the radio area is deactivated in the case of inactive base stations, in other words no radio signal is emitted, whereby radio signals can be received by terminals. By this means, base stations can be employed more efficiently and cost-effectively. A further advantage consists in the fact that the impact on the environment caused by radio signals is reduced.

Further advantageous developments of the invention, in particular a base station configured according to the invention, are set down in the dependent claims.

BRIEF DESCRIPTION OF THE DRAWINGS

The invention will be described in detail in the following with reference to two drawings. In the drawings.

DETAILED DESCRIPTION OF INVENTION

Figure 1:
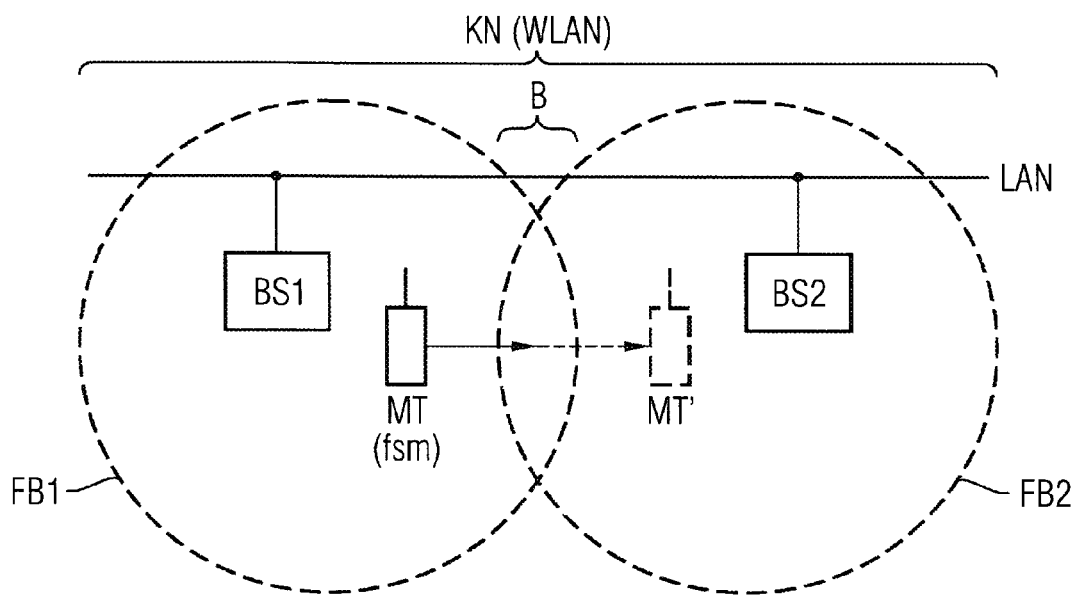
FIG. 1 shows a wireless communication network with two radio areas implementing the invention and FIG. 2 shows a flowchart relating to the wireless communication network illustrated in FIG. 1 in explanation of the invention.

FIG. 1 illustrates a wireless communication network KN which generally has a plurality of radio areas FB. By way of explanation of the invention, the wireless communication network KN is formed by way of example by two radio areas or radio cells FB1,FB2. It is furthermore assumed for the embodiment that the wireless communication network KN is implemented by means of a WLAN (wireless local area network)—indicated in FIG. 1 by the designation KN(WLAN). The base stations BS1,BS2 are connected to one another by way of a local network LAN which is routed to further base stations that are not shown and to other network components such as facilities for accessing further wireless or cabled communication networks. Alternatively, the invention can be provided in different wireless communication networks KN such as DECT or GSM or GRPS networks for example.

The first and second radio areas FB1,FB2 are implemented by the first and second base stations BS1,BS2. To this end, the base stations BS1,BS2 each have radio transmitter units—not shown—which emit a first and a second radio signal fs1,fs2 in an area defined as radio area FB—which is indicated in FIG. 1 by dashed circles. The radio area FB is for example defined by the fact that the level of the radio signal fs1,fs1 in this area is sufficient for it to still be capable of being received in mobile terminals MT which are located in this area. In order to form a continuous wireless communication network KN, the adjacent radio areas FB overlap, in other words the two radio areas FB1,FB2 illustrated also overlap in area B. In this area B the radio signals fs1,fs2 from a mobile terminal MT can be received by both base stations BS1,BS2.

According to the invention, the two base stations BS1,BS2 are switched to inactive if no radio signal fsm is received from any mobile terminal MT—indicated in FIG. 1 by the designation MT(fsm). This means that the radio transmitter units of the two base stations BS1,BS2 are deactivated to the extent that no further radio signal fs1,fs2 is emitted. The receiver units of the two base stations BS1,BS2 remain active, however, in other words radio signals fsm from mobile terminals MT can be received and can initiate further actions.

Let it initially be assumed for the embodiment that a radio signal fsm from a mobile terminal MT is received in neither of the two base stations BS1,BS2. According to the invention, this means that no radio signal fs1,fs2 is emitted from either of the two base stations BS1,BS2.

Let it furthermore be assumed for the embodiment that a mobile terminal MT or mobile part is first situated and activated in the first radio area FB1. The activation is effected for example by supplying the mobile terminal MT with power, whereby a transmitter unit—not shown—in the mobile terminal MT periodically emits a radio signal fsm indicating its identity and a receiver unit—not shown—in the mobile terminal MT is switched to ready-to-receive. This and further steps according to the invention are illustrated in the flowchart in FIG. 2. In the first base station BS1, the radio signal fsm emitted by the activated mobile terminal MT is received and the radio transmitter unit of the first base station BS1 is activated as a result of this, in other words a first radio signal fs1 identifying the first base station BS1 is emitted periodically.

The emitted first radio signal fs1 is received in the mobile terminal MT and as a result of this a registration process which is not shown is initiated, in which the mobile terminal MT is authenticated and registered both in the first base station BS1 and also in the wireless communication network KN. Communication relationships can subsequently be established from or to this mobile terminal MT—not shown.

Let it be assumed as the next step for the embodiment that the mobile terminal MT is moved from the first radio area FB1 across the area B into the second radio area FB2—indicated in FIG. 1 by an arrow and a dashed mobile terminal MT'. If the mobile terminal MT is situated in the area B in which the two radio areas FB1,FB2 overlap, then the radio signal fsm emitted by the mobile terminal MT is also received with sufficient level in the second base station BS2 which has been switched to inactive.

According to the invention, as a result of receiving a radio signal fsm from a wireless terminal MT in the second base station BS2 the latter's radio transmitter unit is activated, in other words a second radio signal fs2 indicating its identity is emitted by the second base station BS2. In the mobile terminal MT, both the radio signal fs1 from the first base station BS1 and also the radio signal fs2 from the second base station BS2 are now received—indicated in FIG. 2 by two arrows designated as fs1,fs2. As long as the level of the received first radio signal fs1 is higher than the level of the second radio signal fs2, then the mobile terminal MT remains registered by way of the first base station BS1 in the wireless communication network KN or an existing communication relationship or a connection will be routed by way of the first base station BS1.

Figure 2:
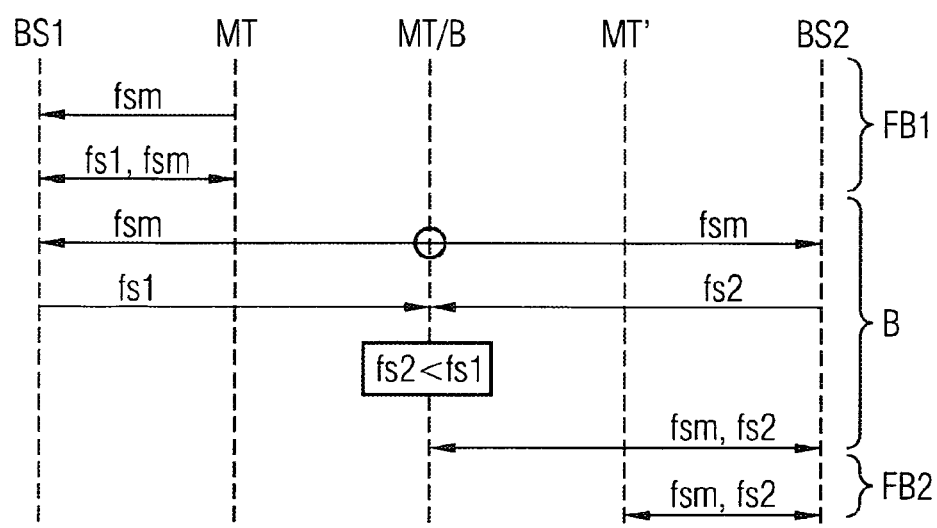

If the mobile terminal MT moves further into the second radio area FB2 in the area B, the level of the second radio signal fs2 will exceed the level of the first radio signal fs1—indicated in FIG. 2 by means of a rectangle labeled with fs2<fs1. If it is definitely determined that the level of the second radio signal fs2 in the mobile terminal MT has been exceeded, a registration process with the wireless communication network KN is performed by way of the second base station BS2, after which the mobile terminal MT is registered by way of the second base station and the registration by way of the first base station BS1 is canceled. This process is also referred to as a handover, whereby an existing communication relationship between the mobile terminal MT and another terminal which is not shown is redirected, or switched, by the first base station BS1 by way of the second base station BS2.

According to the invention, the first base station BS1 is switched to inactive if no further radio signal fsm is received from the mobile terminal MT. A radio signal fsm is assessed in the first base station BS1 as no longer having been received if a predefined level of the received radio signal fsm from the mobile terminal is not reached. This means that if the mobile terminal MT moves out of the first radio area FB1 the first base station BS1 is switched to inactive, whereby it is assumed that no further mobile terminal is emitting a radio signal in the first radio area FB1. In the case of deactivation of the first base station BS1 the transmitter unit of the first base station BS1 is deactivated to the extent that no first radio signal fs1 is emitted. The deactivated, or switched to inactive, first base station BS1 can however continue to receive radio signals fsm from terminals, in other words the receiver unit of the first base station BS1 continues to remain active.

After the mobile terminal MT' has entered the second radio area FB2, the second radio signal fs2 from the second base station BS2 is received in the mobile terminal MT' and the radio signal fsm from the mobile terminal MT' is received in the second base station BS2 and accordingly processed further or forwarded.

If the mobile terminal MT' situated in the second radio area FB2 is deactivated, in other words if the power supply is switched off for example, then no further radio signal fsm is emitted by the mobile terminal MT'. If, according to the invention, no radio signal fsm from the mobile terminal MT' and also no radio signal from a further terminal situated in the second radio area FB2 is received in the second base station BS2, then the second base station BS2 is switched to inactive. This means that the receiver unit of the second base station BS2 is deactivated to the extent that it emits no further second radio signal fs2.

In the case of a plurality of overlapping radio areas—not shown—in the overlap areas the same steps are carried out in each case as described previously, in other words depending on the level of the received radio signals from the base stations a registration is performed by way of the base station in question and any possibly existing communication relationship is redirected or is switched by way of the base station via which the mobile terminal is registered in the wireless communication network. According to the invention, in this situation those base stations are switched to inactive for which no further radio signal is received from a mobile terminal situated in its radio area. Switching to inactive means at least a deactivation of the radio transmitter unit of the base stations concerned, in other words no radio signal is emitted.

According to the invention, in the context of switching a base station BS1,BS2 to active and of subsequently receiving a radio signal fs1,fs2 identifying the base station BS1,BS2 a radio signal fsm can be emitted temporarily or intermittently by a mobile terminal MT. This is advantageous in particular if a change in location of the terminal MT is detected—for example by means of a GPS system integrated in the terminal MT—or if the mobile terminal MT has emitted no further radio signal (fsm) over a period of time—in particular an extended period of time. By this means, the current radio area FB1,FB2 or the current base station BS1,BS2 or also in the case of paging operation the current call area can be conveyed to the terminal MT and an incoming call can be forwarded to the respective radio or call area.

The invention is not restricted to the embodiment, but can be used in all wireless communication networks in which radio areas or radio cells are formed with base stations, whereby the steps according to the invention can in each case be incorporated in protocols or radio signals of the respective wireless communication networks KN with little additional effort. Through the invention, it is possible to reduce both the power consumption of the base stations and also the environmental impact caused by the base stations through radio signals.

The invention claimed is:

1. A method for controlling a base station implementing a radio area in a wireless communication network with a mobile terminal, the base station including a transmitter periodically emitting a radio signal identifying the base station that can be measured by the mobile terminal and a receiver receiving radio signals from the mobile terminal, the method comprising:
    switching the base station transmitter from active to inactive when a radio signal is not received from the mobile terminal, wherein an inactive base station transmitter does not periodically emit the radio signal identifying the base station that can be measured by the mobile terminal in the implemented radio area, the base station receiver remaining active and able to receive radio signals from the mobile terminal while the base station transmitter is inactive; and
    switching the base station transmitter from inactive to active in response to receiving the radio signal from the mobile terminal, wherein an active base station transmitter periodically emits the radio signal identifying the base station that can be measured by the mobile terminal in the implemented radio area, and
    wherein the base station receiver remains active during switching of the base station transmitter between the active and inactive states.

2. The method as claimed in claim 1, further comprising deactivating the radio area of the base station in response to the base station transmitter being switched to inactive.

3. The method as claimed in claim 1, wherein the radio signal is emitted by the mobile terminal in the context of an existing communication relationship or one which is to be initiated in the case of an activated mobile terminal.

4. The method as claimed in claim 1, further comprising switching a further base station transmitter from inactive to active when the mobile terminal changes location from the radio area of the base station to a further radio area of the further base station such that the radio signal from the mobile terminal is received by the further base station.

5. The method as claimed in claim 4, wherein when the change in location of the mobile terminal is detected the radio signal identifying the mobile terminal is emitted temporarily or intermittently by the mobile terminal in the context of switching the further base station transmitter to active and of subsequently receiving a further radio signal identifying the further base station.

6. The method as claimed in claim 4, wherein after a time duration in which the radio signal has not been emitted by the mobile terminal, the radio signal is emitted temporarily or intermittently by the mobile terminal in the context of switching the further base station transmitter to active and of subsequently receiving a further radio signal identifying the further base station.

7. The method as claimed in claim 4, wherein the change of location of the mobile terminal from the radio area of the base station to the further radio area of the further base station is initiated when a level of a further radio signal received in the mobile terminal from the further base station exceeds a level of the radio signal received from the base station.

8. The method as claimed in claim 1, wherein the radio signal identifying the mobile terminal is periodically emitted by an active mobile terminal.

9. The method as claimed in claim 1, wherein the mobile terminal receives the radio signal identifying the base station, and wherein the mobile terminal temporarily or intermittently emits the radio signal identifying the mobile terminal in response to receiving the radio signal from the base station.

10. A base station for a wireless communication network with a mobile terminal, the base station comprising:
    a receiver for receiving a first radio signal from the mobile terminal;
    a transmitter for emitting a second radio signal identifying the base station that can be measured by a mobile terminal in an implemented radio area; and
    a state for the base station transmitter,
    wherein the state of the base station transmitter is switched:
        from active to inactive if the first radio signal is not received, wherein the receiver is still active and able to receive the first radio signal, wherein an inactive base station transmitter does not periodically emit the second radio signal identifying the base station that can be measured by the mobile terminal in the implemented radio area, and
        from inactive to active in response to receiving the first radio signal, wherein an active base station transmitter periodically emits the second radio signal identifying the base station that can be measured by the mobile terminal in the implemented radio area, and
    wherein the base station receiver remains active during switching of the base station transmitter between the active and inactive states.

11. The base station as claimed in claim 10, wherein a radio area of the base station is defined by the emission of the second radio signal, wherein the base station transmitter is deactivated in response to switching the state to inactive, and wherein the receiver remains active in response to deactivating the base station transmitter.

12. The base station as claimed in claim 10, wherein the first radio signal is periodically emitted by the mobile terminal for identifying the mobile terminal.

13. The base station as claimed in claim 10, wherein the mobile terminal is configured such that the first radio signal is emitted in the context of an existing communication relationship or one which is to be initiated in the case of an activated mobile terminal.

* * * * *